United States Patent
Postavilsky et al.

(10) Patent No.: US 10,133,483 B2
(45) Date of Patent: Nov. 20, 2018

(54) MEMORY SYSTEM AND METHOD FOR DIFFERENTIAL THERMAL THROTTLING

(71) Applicant: SanDisk Technologies Inc., Plano, TX (US)

(72) Inventors: Evgeny Postavilsky, Ashkelon (IL); Gadi Vishne, Petach-Tikva (IL); Judah Gamliel Hahn, Ofra (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 157 days.

(21) Appl. No.: 14/698,511

(22) Filed: Apr. 28, 2015

(65) Prior Publication Data
US 2016/0320971 A1   Nov. 3, 2016

(51) Int. Cl.
*G06F 3/06* (2006.01)
*G06F 1/20* (2006.01)

(52) U.S. Cl.
CPC ............ *G06F 3/0604* (2013.01); *G06F 1/206* (2013.01); *G06F 3/0653* (2013.01); *G06F 3/0659* (2013.01); *G06F 3/0679* (2013.01)

(58) Field of Classification Search
CPC ...... G06F 1/206; G06F 3/0604; G06F 3/0605; G06F 3/0653; G06F 3/0659; G06F 3/0679
USPC ........................................................ 711/154
See application file for complete search history.

(56) References Cited

U.S. PATENT DOCUMENTS

| | | | | |
|---|---|---|---|---|
| 7,318,130 | B2 * | 1/2008 | Morrow | G06F 1/206 711/100 |
| 2011/0161554 | A1 * | 6/2011 | Selinger | G06F 13/1668 711/103 |
| 2012/0331207 | A1 * | 12/2012 | Lassa | G06F 1/3278 711/103 |
| 2012/0331282 | A1 * | 12/2012 | Yurzola | G06F 1/3275 713/100 |
| 2014/0005854 | A1 * | 1/2014 | Lim | G06F 1/206 700/299 |
| 2016/0170642 | A1 * | 6/2016 | Miyamoto | G06F 3/061 711/103 |

* cited by examiner

*Primary Examiner* — Tracy A Warren
(74) *Attorney, Agent, or Firm* — Loza & Loza, LLP; Gabriel Fitch

(57) ABSTRACT

A memory system and method for differential thermal throttling are disclosed. In one embodiment, a memory system is provided comprising a memory and a controller. The controller is configured to receive a command to perform an operation in the memory and analyze the command to determine whether thermal throttling the memory system would result in an unacceptable impact on user experience. In response to determining that thermal throttling the memory system would result in an unacceptable impact on user experience, the controller executes the command. In response to determining that thermal throttling the memory system would not result in an unacceptable impact on user experience, the controller thermal throttles the memory system. Other embodiments are provided.

19 Claims, 11 Drawing Sheets

MEMORY SYSTEM AND METHOD FOR DIFFERENTIAL THERMAL THROTTLING

BACKGROUND

A memory system, such as a solid-state drive (SSD), can contain a plurality of memory dies (e.g., in a multi-die package) that can be read or written in parallel. During read and write operations, the memory system consumes power and generates heat. Very intensive or long-running, sustained workloads (especially write-oriented workloads) can cause the memory system to generate so much heat that it can exceed its operating temperature. In such situations, the controller can perform a thermal throttling operation to reduce the memory system's temperature by slowing the throughput of the memory system, thus allowing the overheating components to cool down. This is typically accomplished by reducing die parallelism or by inserting artificial delays in operational flows.

DETAILED DESCRIPTION OF THE PRESENTLY PREFERRED EMBODIMENTS

Figure 1A:
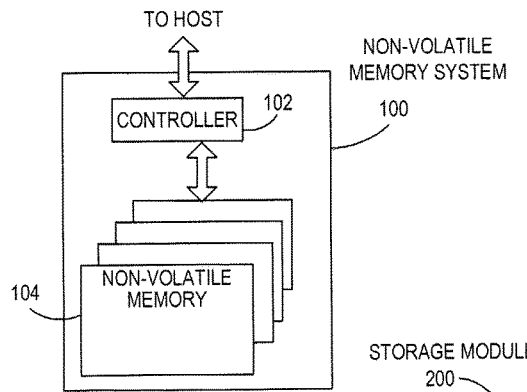
FIG. 1A is a block diagram of a non-volatile memory system of an embodiment.

By way of introduction, the below embodiments relate to a memory system and method for differential thermal throttling. In one embodiment, a memory system is provided comprising a memory and a controller. The controller is configured to receive a command to perform an operation in the memory and analyze the command to determine whether thermal throttling the memory system would result in an unacceptable impact on user experience. In response to determining that thermal throttling the memory system would result in an unacceptable impact on user experience, the controller executes the command. In response to determining that thermal throttling the memory system would not result in an unacceptable impact on user experience, the controller thermal throttles the memory system.

In another embodiment, a memory system is provided comprising a memory, a command analyzing module configured to receive a plurality of commands to perform operations in the memory and assign a thermal value to each command, and a throttling arbiter module in communication with the memory and the command analyzing module, wherein the throttling arbiter module is configured to determine whether a command should be performed or whether the memory system should be thermal throttled based on the thermal value assigned to the command.

In another embodiment, a method for differential thermal throttling is provided that is performed in a memory system comprising a memory. The method comprises receiving a command to perform an operation in the memory, analyzing the command to determine whether thermal throttling the memory system would result in a perceived performance problem, and thermally throttling the memory system only if it is determined that thermal throttling the memory system would not result in a perceived performance problem.

In some embodiments, the command is analyzed to determine one or more of the following: an operation type, a stream type, a block size of data associated with the command, and queue parameters associated with the command.

In some embodiments, the command is analyzed in response to determining that the memory system is in a thermal throttled mode. In some embodiments, the thermal throttle mode occurs when a temperature of the memory system exceeds a threshold temperature.

In some embodiments, thermal throttling the memory system comprises inserting a delay, while, in other embodiments where the memory system comprises a plurality of memory dies, thermal throttling the memory system comprises reducing die parallelism. Other examples of throttling include reducing clock speed in a controller or part of the controller, or reducing the bus speed between the controller and the non-volatile memory components.

In some embodiments, the memory system is embedded in a host, while, in other embodiments, the memory system is removably connected to a host. The memory can comprise a three-dimensional memory.

Other embodiments are possible, and each of the embodiments can be used alone or together in combination. Accordingly, various embodiments will now be described with reference to the attached drawings.

As mentioned in the background section above, during read and write operations, a memory system consumes power and generates heat. Very intensive or long-running, sustained workloads (especially write-oriented workloads) can cause the memory system to generate so much heat that it can exceed its operating temperature. In such situations, the controller of the memory system can perform a thermal throttling operation to reduce the memory system's temperature by slowing the throughput of the memory system, thus allowing the overheating components to cool down. This is typically accomplished by reducing die parallelism or by inserting artificial delays in operational flows. Other examples of throttling include reducing clock speed in a controller or part of the controller, or reducing the bus speed between the controller and the non-volatile memory components.

However, thermal throttling is generally non-discriminatory and does not differentiate between operations that impact user experience and those that do not. The net result is that the user experience is adversely impacted more than necessary. The following embodiments can be used to address this problem, allowing better control over the throttling process and reducing the user experience impact of high-temperature operations.

Before turning to these and other embodiments, the following paragraphs provide a discussion of exemplary memory systems that can be used with these embodiments. Of course, these are just examples, and other suitable types of storage modules can be used.

Figure 1B:
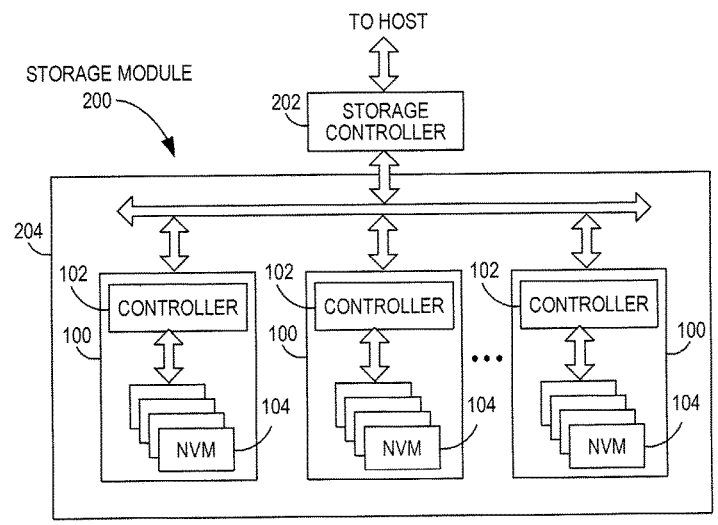
FIG. 1B is a block diagram illustrating an exemplary storage module of an embodiment.
Figure 1C:
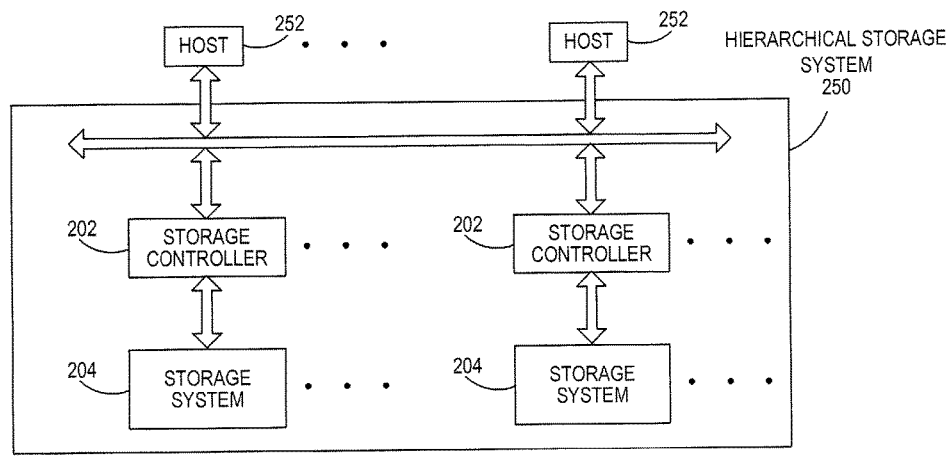
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system,100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as those shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
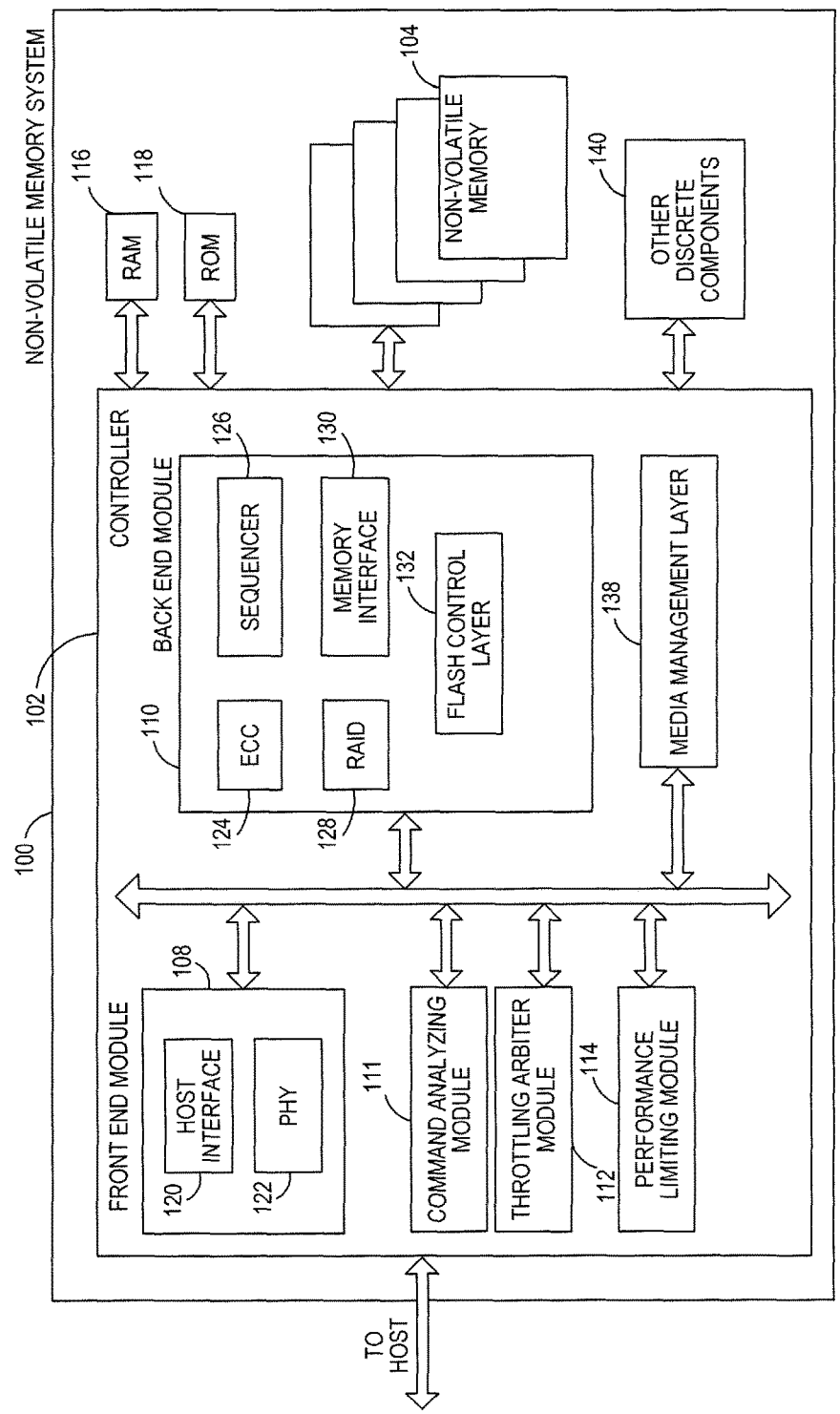
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a command analyzing module 111, a throttling arbiter module 112, and a performance limiting module 114. These modules will be discussed in more detail below. However, in general, the command analyzing module 111 is configured to receive a plurality of commands to perform operations in the memory 104 and assign a thermal value to each command. The throttling arbiter module 112 is configured to determine whether a command should be performed or whether the memory system 100 should be thermal throttled based on the thermal value assigned to the command. The performance limiting module 114 is configured to thermal throttle the memory system 100 by inserting a delay, for example (other ways of thermal throttling can be used). FIG. 2C shows one exemplary implementation of these modules. As shown in FIG. 2C, the command analyzing module 111 (which here takes the form of a stream detecting module) and the throttling arbiter module 112 are in the data path 295 (which is separate from the control path 290) between the front end 102 and the memory (here, NAND storage) 104. The performance limiting module 114 is in the data path 295.

Referring again to the other modules of the controller 102 of FIG. 2A, a read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104.

System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
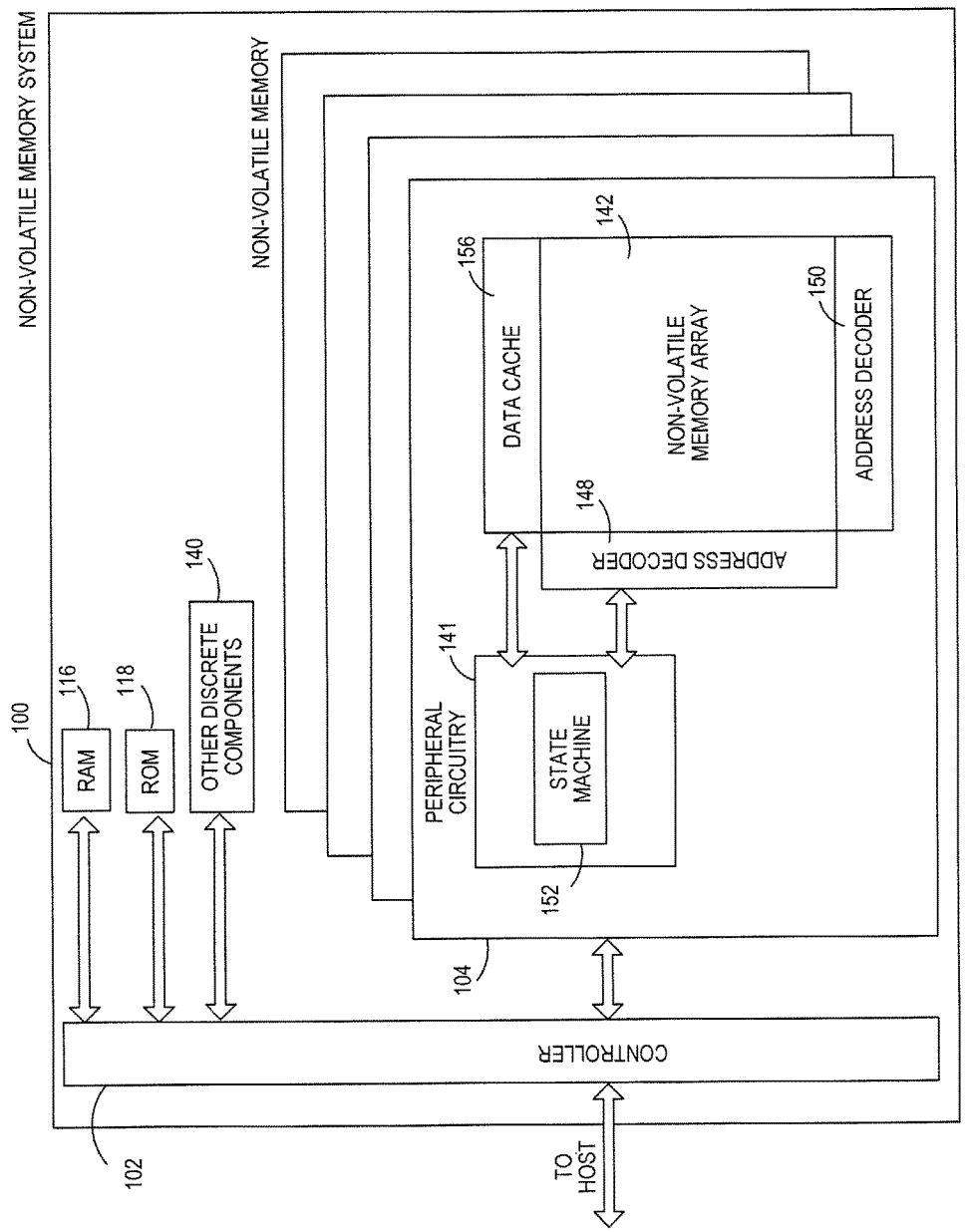
FIG. 2B is a block diagram illustrating exemplary components of the non-volatile memory of the non-volatile memory storage system illustrated in FIG. 1A according to an embodiment.
Figure 2C:
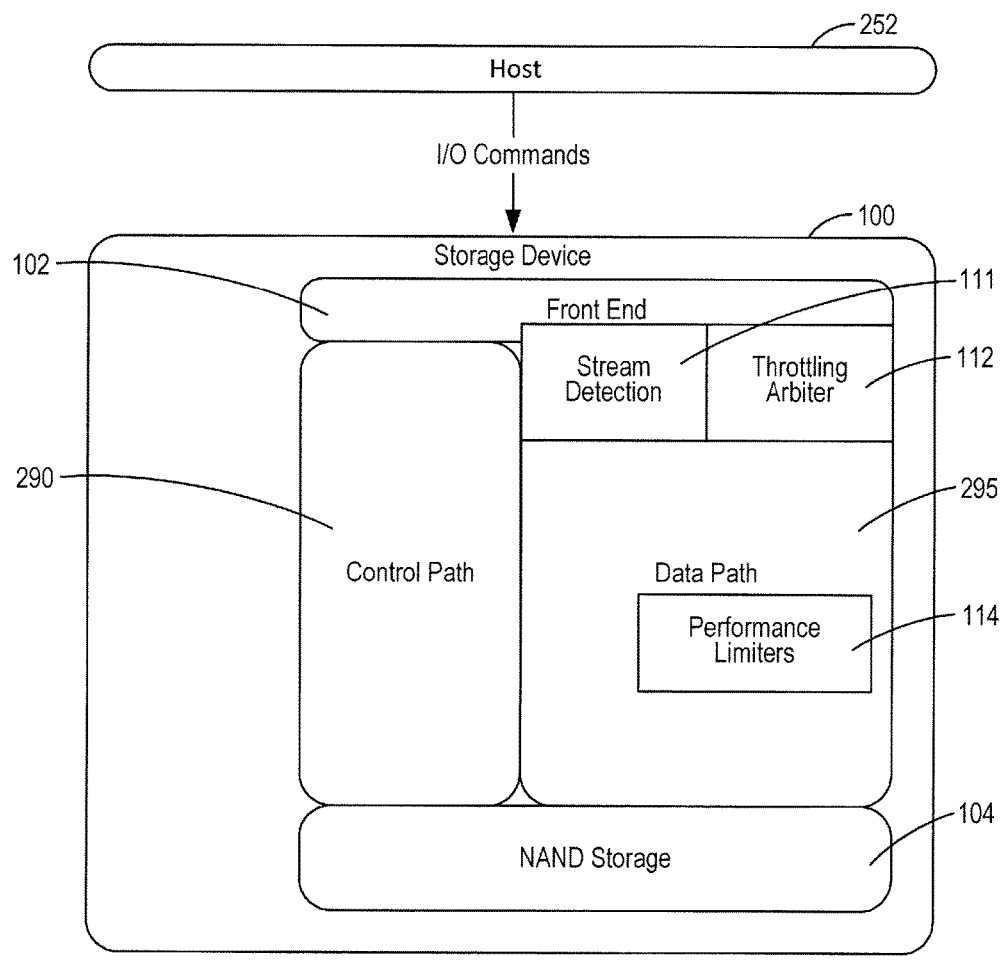
FIG. 2C is a block diagram of a memory system of an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

As mentioned above, during read and write operations, the memory system 100 consumes power and generates heat, and very intensive or long-running, sustained workloads (especially write-oriented workloads) can cause the memory system 100 to generate so much heat that it can exceed its operating temperature. Prior memory systems addressed this situation by performing a thermal throttling operation to reduce the memory system's temperature by slowing the throughput of the memory system, thus allowing the overheating components to cool down. This is shown in FIGS. 3A and 3B.

Figures 3A, 3B:
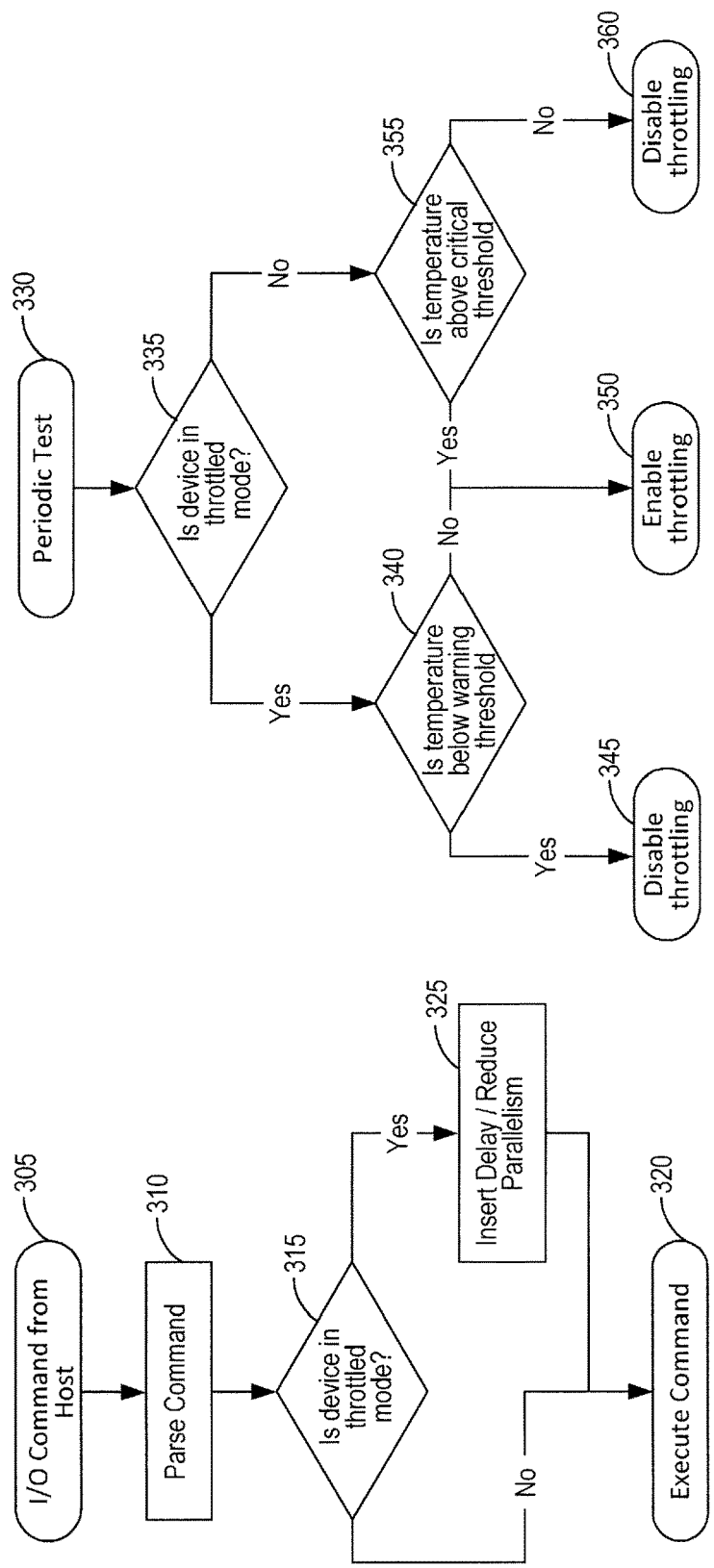
FIG. 3A is a flow chart of a throttling method performed when a command is received by a memory system.
FIG. 3B is a flow chart of a throttling method performed during a periodic test of a memory system.

FIG. 3A is a flow chart of a throttling method performed when a command is received by a memory system (act 305). The memory system parses the command to identify the command and the operation that needs to be performed (act 310). The memory system then determines if it is in a throttled mode (act 315). For example, the memory system 100 can be in a throttled mode if the temperature of the memory system is above a threshold, which can be defined during characterization of the memory system (there can be multiple thresholds (e.g., warning and critical). If the memory system is not in a throttled mode, the memory system executes the command (act 320). If the memory system is in a throttled mode, the memory system is thermal throttled, e.g., by introducing a delay during or between commands or by reducing parallelism (e.g., using two instead of four memory dies) (act 325).

As shown in FIG. 3B, thermal throttling can also occur during a periodic test (act 330). In this situation, the memory system first determines if it is in a thermal throttled mode (act 335). Again, this can occur by checking if the temperature of the memory system is above a threshold. If it is, the memory system determines if the temperature is below a warning threshold (act 340). If the temperature is below the warning threshold, the memory system can disable the throttling (act 350). Otherwise, the memory system can enable the throttling (act 350). Returning back to act 335, if the memory system is not in a throttled mode, the memory system can determine if the temperature is above a critical temperature. If it is, the memory system can enable throttling (act 350). Otherwise, the memory system can disable throttling (act 360).

The problem with the thermal throttling methods shown in FIGS. 3A and 3B is that they are generally non-discriminatory and do not differentiate between operations that impact user experience and those that do not. Accordingly, the methods in FIGS. 3A and 3B perform thermal throttling on each operation, regardless of the thermal cost of the operation.

Figure 4:
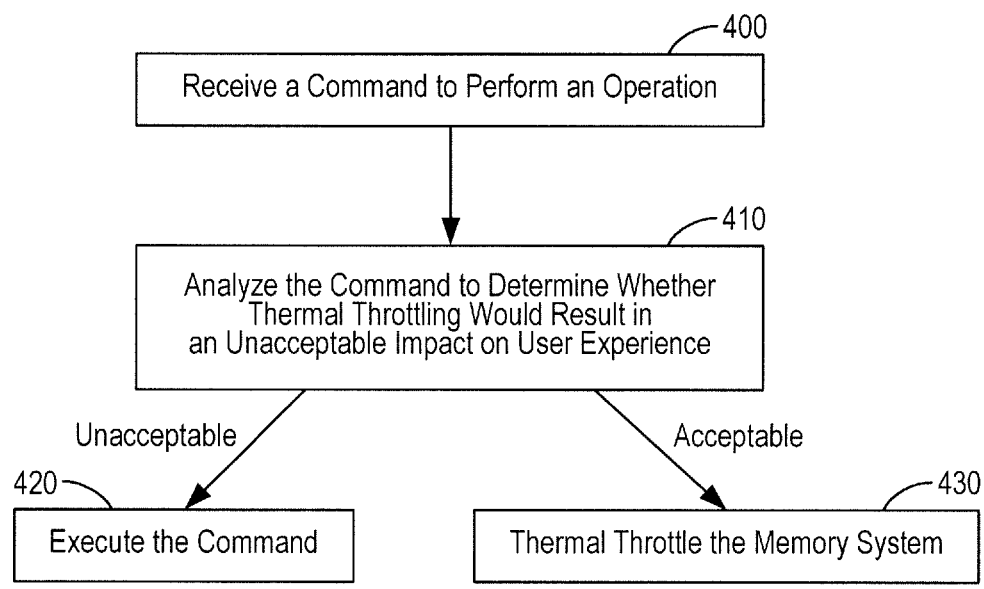
FIG. 4 is a flow chart of a differential thermal throttling method of an embodiment.

To address this problem, the method of differential thermal throttling shown in FIG. 4 can be used. As shown in FIG. 4, the memory system 100 (e.g., the controller 102 or some other component of the memory system 100) receives a command to perform an operation in the memory 104 (act 400). The memory system 100 then analyzes the command to determine whether thermal throttling the memory system 100 would result in an unacceptable impact on user experience (act 410). If thermal throttling the memory system 100 would result in an unacceptable impact on user experience, the memory system 100 executes the command (act 420), thereby avoiding the unacceptable impact caused by thermal throttling. On the other hand, if thermal throttling the memory system 100 would not result in an unacceptable impact on user experience, thermal throttling is performed (act 430).

Whether or not thermal throttling the memory system 100 would result in an unacceptable impact on user experience can be determined in any suitable way. For example, the memory system 100 can analyze the command to determine one or more of the following: operation type (e.g., read versus write), stream type (e.g., random versus sequential), block size of data associated with the command (e.g., large versus small), and queue parameters associated with the command (e.g., queue utilization and/or depth). Each of these examples will now be discussed in conjunction with FIGS. 5-8. (Unacceptable impact on user experience is one example of a perceived performance problem. The memory system 100 can look for other perceived performance problems in addition to or instead of an unacceptable impact on user experience.)

Figure 5:
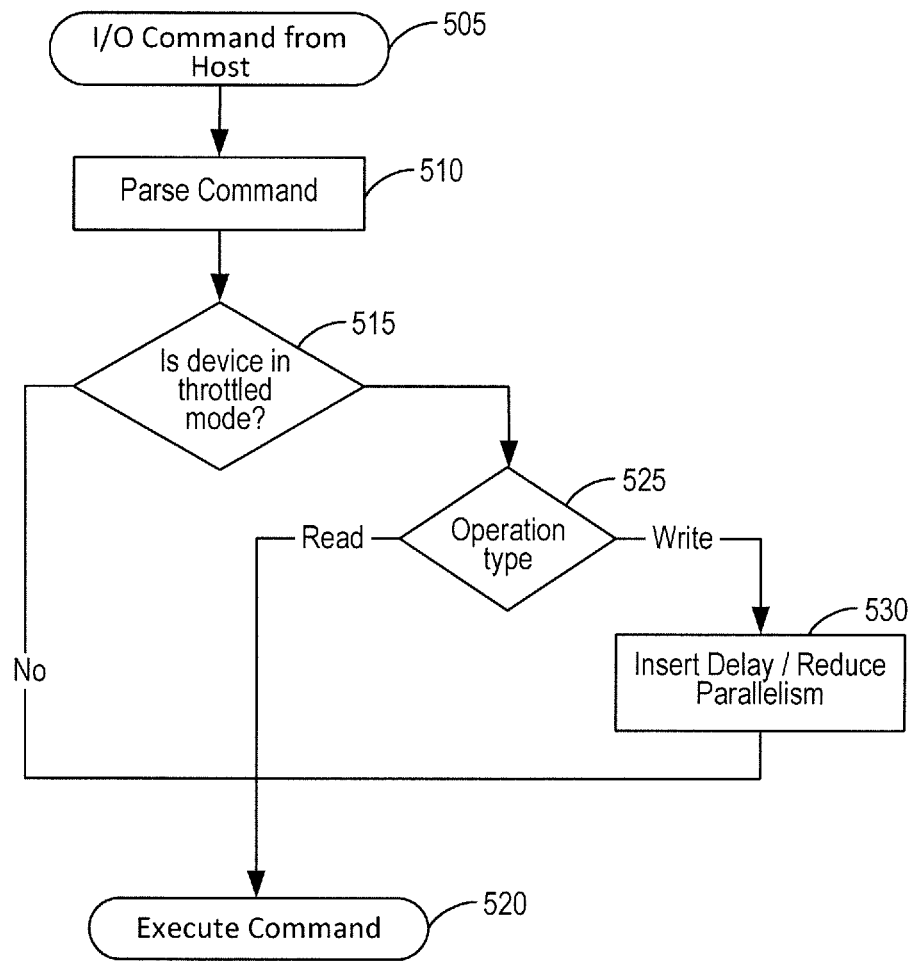
FIG. 5 is a flow chart of a differential thermal throttling method of an embodiment that is based on an operation type.

As shown in FIG. 5, after the memory system 100 receives an input/output (I/O) command from a host (or from an entity internal to the memory system 100) (act 505), the memory system 100 parses the command to identify the command and the operation that needs to be performed (act 510). The memory system 100 then, optionally, determines if the memory system 100 is in a throttled mode (e.g., by determining if a temperature of the memory system 100 (e.g., of the memory die) exceeds a threshold) (act 515). If the memory system is not in a throttled mode, the memory system 100 executes the command (act 520). However, if the memory system 100 is in a throttled mode, the memory system 100 analyzes the command to determine whether thermal throttling the memory system 100 would result in an unacceptable impact on user experience/a perceived performance problem by an end user. That is, the memory system 100 uses the expected user experience impact of each operation it receives (e.g., during throttled mode) in order to allow for thermal reduction without significantly impacting perceived performance by the user. In the example of FIG. 5, the criterion used to determine this is operation type; specifically, whether the operation is a read operation or a write operation. Write operations typically require much more power than read operations. Delays in read operations typically have more of a negative impact than delays in a write operation, as the user is usually expecting something to happen in response to a read command (e.g., waiting for the results of a browsing operation). That this, a host generally does not wait for write operations to complete. As such, the user experience impact for slow writes is not as significant as for slow reads. Accordingly, in this example, if the operation type is read, the command is executed (act 520); whereas, if the operation type is write, the memory system 100 is thermal throttled (e.g., by inserting a delay and/or by reducing die parallelism) (act 530). In this way, only write operations are throttled.

Figure 6:
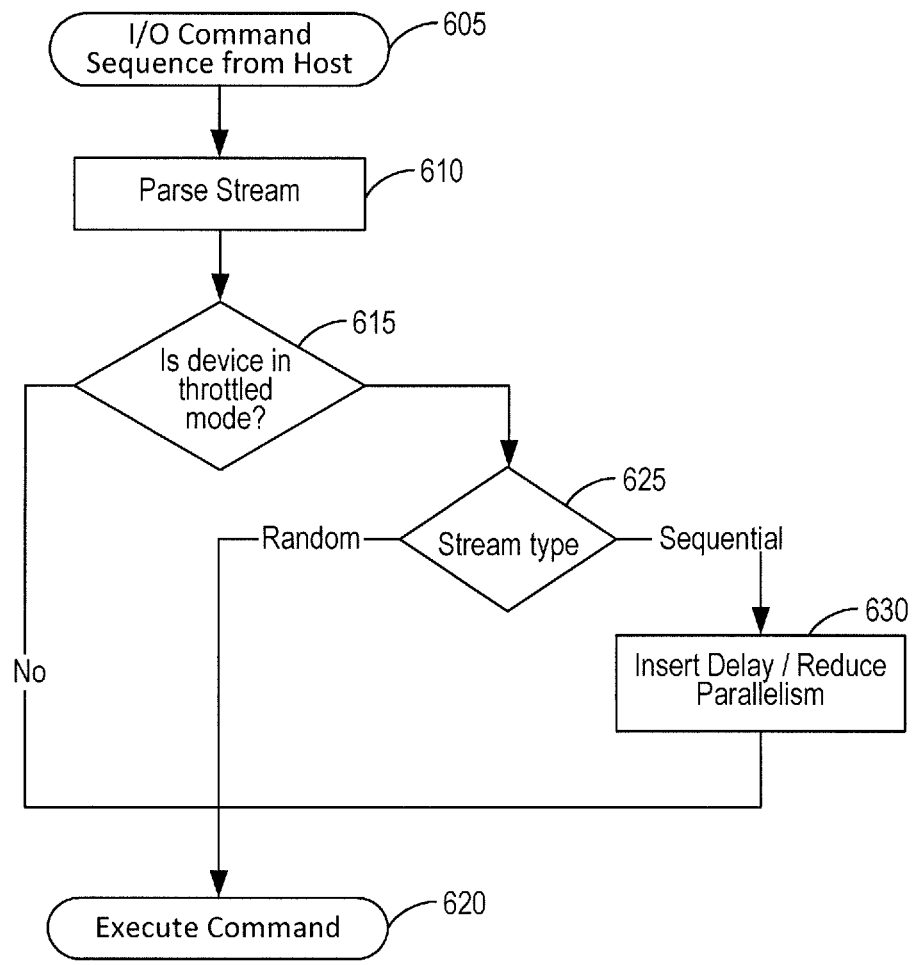
FIG. 6 is a flow chart of a stream-based differential thermal throttling method of an embodiment.

As another example, instead of looking at a single command to determine throttling, a stream of commands in a single queue can be analyzed. This example is shown in FIG. 6. As shown in FIG. 6, after the memory system 100 receives an input/output (I/O) command from a host (or from an entity internal to the memory system 100) (act 605), the memory system 100 parses the stream of commands to identify the commands and the operations that need to be performed (act 610). The memory system 100 then, optionally, determines if the memory system 100 is in a throttled mode (e.g., by determining if a temperature of the memory system 100 (e.g., of the memory die) exceeds a threshold) (act 615). If it isn't in a throttled mode, the memory system 100 executes the command (act 620). However, if the memory system 100 is in a throttled mode, the memory system 100 analyzes the stream type (act 625). If the stream type is random, that can be an indication that the command is from a user, as random stream are often an indicator of user behavior. In that case, the command is executed (act 620). However, if the stream type is sequential, the memory system 100 is thermal throttled (e.g., by inserting a delay and/or by reducing die parallelism) (act 630), as a sequential stream is typically an indicator of an application and not a user. Accordingly, in this example, random commands are not throttled, but sequential commands are. The rationale is that a long sequence will generate a significant thermal impact, while short random operations are less likely to impact temperature.

Figure 7:
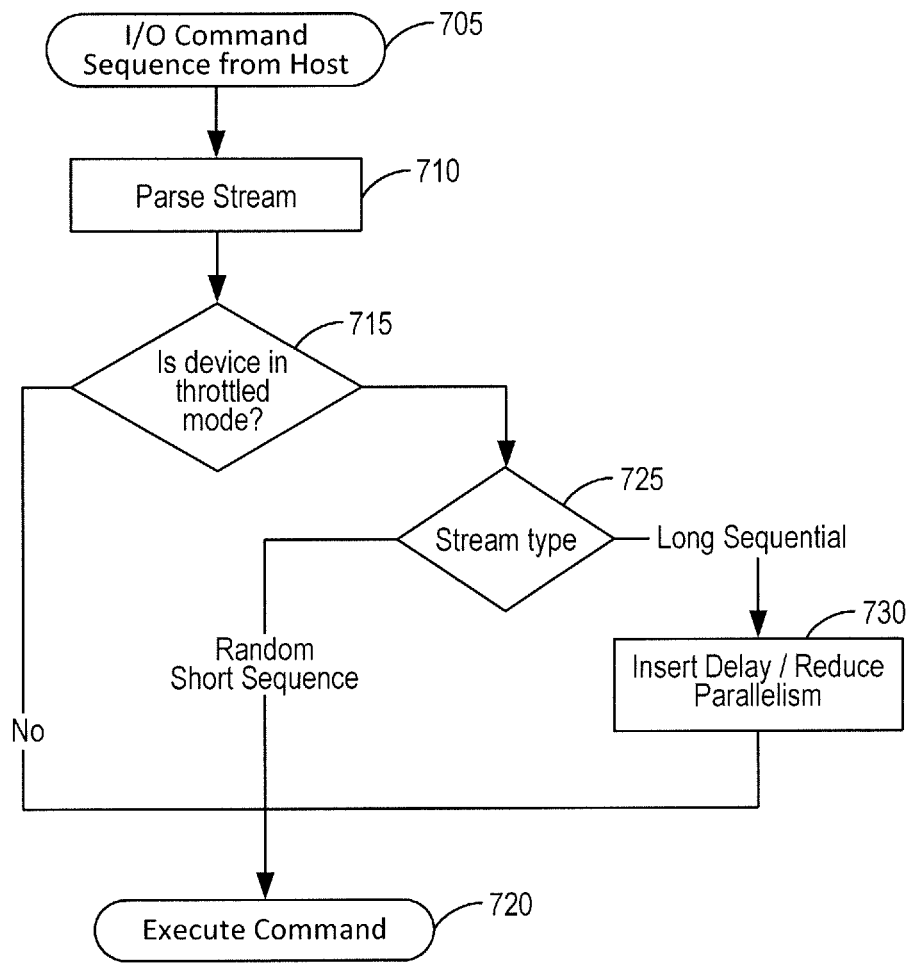
FIG. 7 is a flow chart of a long/short command sequence differential thermal throttling method of an embodiment.

In another example, only long sequential streams (i.e., those with command transfer sizes that reach the maximum size allowed by a protocol) are throttled, while allowing all shorter sequences to pass. This allows operations like file copy to be throttled without constraining regular user workflow operations. This example is shown in FIG. 7. As shown in FIG. 7, after the memory system 100 receives an input/output (I/O) command from a host (or from an entity internal to the memory system 100) (act 705), the memory system 100 parses the stream of commands to identify the commands and the operations that need to be performed (act 710). The memory system 100 then, optionally, determines if the memory system 100 is in a throttled mode (e.g., by determining if a temperature of the memory system 100 (e.g., of the memory die) exceeds a threshold) (act 715). If it isn't in a throttled mode, the memory system 100 executes the command (act 720). However, if the memory system 100 is in a throttled mode, the memory system 100 analyzes the stream type (act 725) If the stream type is a short, random sequence, that can be an indication that the command is from a user, as short, random streams are often an indicator of user behavior. In that case, the command is executed (act 720). However, if the stream type is long and sequential, the memory system 100 is thermal throttled (e.g., by inserting a delay and/or by reducing die parallelism) (act 730), as a long, sequential stream is typically an indicator of an application and not a user.

Figure 8:
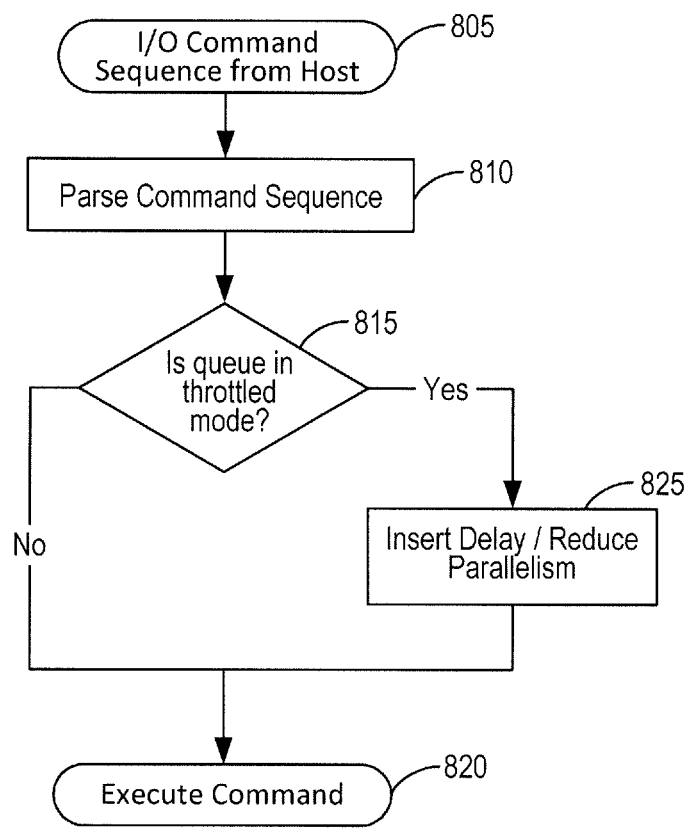
FIG. 8 is a flow chart of a differential thermal throttling method of an embodiment that is based on queue parameters.

As yet another example, differential thermal throttling can be based on queue parameters, which may be useful in multi-queue environments, such as NVMe, where each queue is assessed individually. As shown in FIG. 8, after the memory system 100 receives an input/output (I/O) command from a host (or from an entity internal to the memory system 100) (act 805), the memory system 100 parses the command sequence to identify the commands and the operations that need to be performed (act 810). The memory system 100 then determines if the queue is in a throttled mode (e.g., by determining if a temperature of the memory system 100 (e.g., of the memory die) exceeds a threshold) (act 815). If it is not in a throttled mode, the command is executed (act 820). If it is in a throttled mode, the memory system 100 is thermal throttled (e.g., by inserting a delay and/or by reducing die parallelism) (act 825). In this way, commands from queues deemed to be critical/important to user experience are not throttled, while other commands are. The queue designation can be determined either via host hints or by device-derived hinting.

Figure 9:
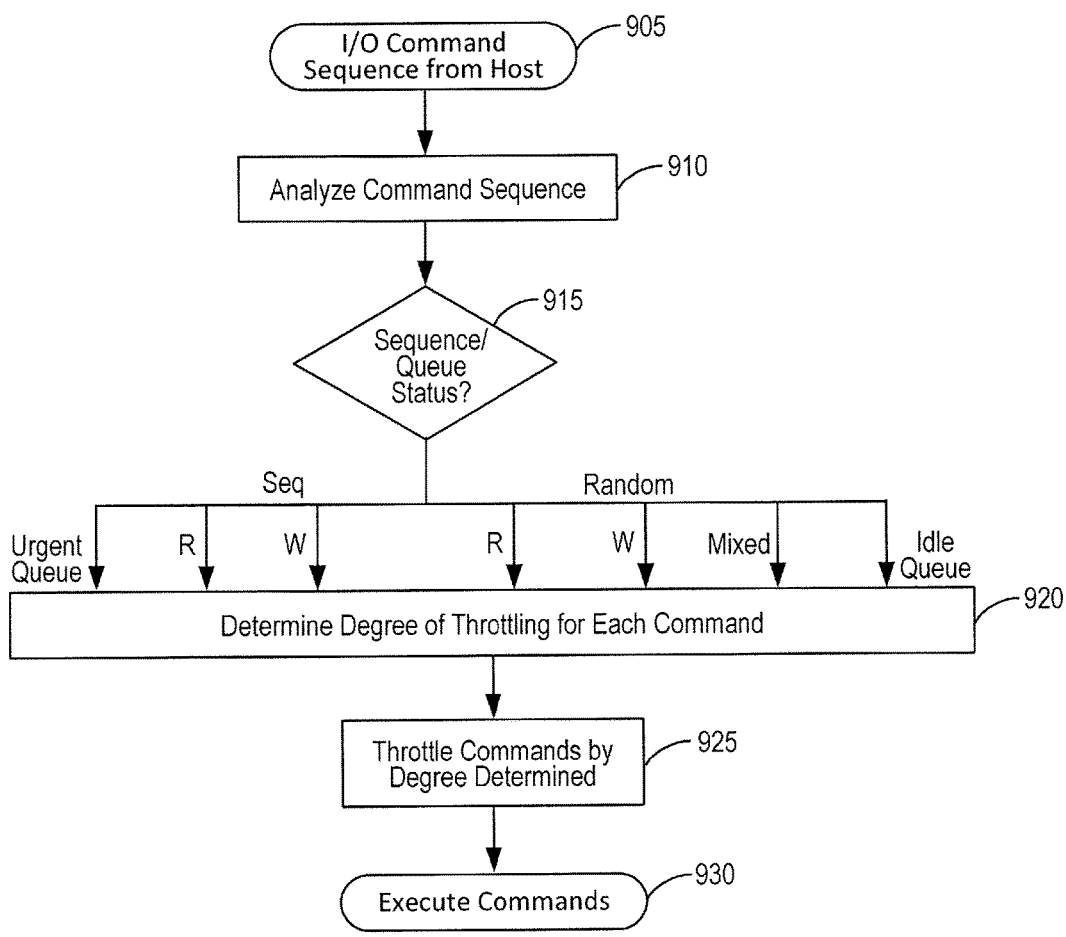
FIG. 9 is a flow chart of a differential thermal throttling method of an embodiment.

In an alternate embodiment, queue and sequence status are fed into a module that determines the level of throttling for each command. The throttling algorithm can be cost based to allow assigning a different level of delay or parallelism to each command based on these inputs. This embodiment will now be discussed in reference to FIG. 9. As shown in FIG. 9, after the memory system 100 receives an input/output (I/O) command from a host (or from an entity internal to the memory system 100) (act 905), the memory system 100 analyzes the command sequence to identify the commands and the operations that need to be performed (act 910). The memory system 100 then determines the sequence/queue status (act 915) The statuses are then fed into a throttling arbiter module to determine the degree of throttling of each command (act 920). The memory system 100 then thermal throttles the commands by the degree determined (act 925) and executes the commands (act 930).

This method can be performed with the architecture previously described in FIG. 2C, where the command analyzing (e.g., stream detection) module 111 receives a plurality of commands to perform operations in the memory and assign a thermal value to each command, and the throttling arbiter module 112 determine whether a command should be performed or whether the memory system should be thermal throttled based on the thermal value assigned to the command. So, an operation cost of 0 can be set for urgent commands (e.g., those originating from an urgent host queue), while other operation types (e.g., write and read) would be assigned a cost. The cost can be increased by a fixed factor for sequential operations and decreased for random operations. Also, the cost can be increased or scaled for operations originating from an idle process or queue.

Power token budgets can also be used for thermal throttling (e.g., a host-directed throttling can use a reduced power budget of 2-3 W instead of 4.5 W or 5.5 W, for example). With power tokens, a power budget is used to control the average power consumed by the memory device, where read and write operations are allocated a specific cost, and the total number of power tokens is allocated based on power state.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory system comprising:
   a memory; and
   a controller in communication with the memory, wherein the controller is configured to:
      determine that the memory system is in a thermal throttled mode;
      receive a stream of commands from a host to perform operations in the memory; and
      after determining that the memory system is in the thermal throttled mode:
         analyze the stream of commands to determine whether or not the stream of commands is from a user who is expecting a response to the stream of commands, wherein the analyzing comprises:
            determining whether the stream of commands comprises read commands or write commands;
            determining whether a stream type is random or sequential; and
            determining whether a command transfer size of the stream of commands is greater than or less than a threshold;
         wherein the determining that the stream of commands is from the user who is expecting the response to the stream of commands is in response to determining that (i) the stream of commands comprises read commands, (ii) the stream type is random; and (iii) the command transfer size of the stream of commands is less than the threshold; and
         execute, in response to the determining that the stream of commands is from the user who is expecting the response to the stream of commands, the stream of commands while the memory system is in the thermal throttled mode; and
         otherwise, delay execution of the stream of commands because the memory system is in the thermal throttled mode.

2. The memory system of claim 1, wherein the stream of commands is analyzed to determine queue parameters associated with the stream of commands.

3. The memory system of claim 1, wherein the controller is configured to delay execution of the stream of commands by inserting a delay.

4. The memory system of claim 1, wherein the memory comprises a plurality of memory dies, and wherein the controller is configured to delay execution of the stream of commands by reducing die parallelism.

5. The memory system of claim 1, wherein the memory comprises a three-dimensional memory.

6. The memory system of claim 1, wherein the memory system is embedded in the host.

7. The memory system of claim 1, wherein the memory system is removably connected to the host.

8. A memory system comprising:
   a memory;
   means for receiving a stream of commands to perform an operation in the memory;
   means for determining that the memory system is in a thermal throttled mode;
   means for, after determining that the memory system is in the thermal throttled mode:
      analyzing the stream of commands to determine whether or not the stream of commands is from a user who is expecting a response to the stream of commands, wherein the analyzing comprises:
         determining whether the stream of commands comprises read commands or write commands;
         determining whether a stream type is random or sequential; and
         determining whether a command transfer size of the stream of commands is greater than or less than a threshold;
      wherein the determining that the stream of commands is from the user who is expecting the response to the stream of commands is in response to determining that (i) the stream of commands comprises read commands, (ii) the stream type is random; and (iii) the command transfer size of the stream of commands is less than the threshold; and means for executing, in response to the determining that the stream of commands is from the user who is expecting the response to the stream of commands, the stream of commands while the memory system is in the thermal throttled mode; and means for otherwise delaying execution of the stream of commands because the memory system is in the thermal throttled mode.

9. The memory system of claim 8, wherein the means for determining whether or not the stream of commands is from the user who is expecting the response to the command comprises means for determining queue parameters associated with the stream of commands.

10. The memory system of claim 8, wherein the memory comprises a three-dimensional memory.

11. The memory system of claim 8:
wherein the means for receiving the stream of commands to perform the operation in the memory comprises means for receiving the stream of commands from a host; and
wherein the memory system is embedded in the host.

12. The memory system of claim 8:
wherein the means for receiving the stream of commands to perform the operation in the memory comprises means for receiving the stream of commands from a host; and
wherein the memory system is removably connected to the host.

13. A method for differential thermal throttling, the method comprising:
performing the following in a memory system comprising a memory after determining that the memory system is in a thermal throttled mode:
analyzing a stream of commands to determine whether or not the stream of commands is from a user who is expecting a response to the stream of commands; and
executing, in response to the determining that the stream of commands is from the user who is expecting the response to the stream of commands, the stream of commands while the memory system is in the thermal throttled mode; and otherwise, delaying execution of the stream of commands because the memory system is in the thermal throttled mode;

wherein the determining that the stream of commands is from the user who is expecting the response to the stream of commands comprises determining that (i) the stream of commands comprises read commands, (ii) a type of the stream is random; and (iii) a command transfer size of the stream of commands is less than a threshold.

14. The method of claim 13, wherein the stream of commands is analyzed to determine queue parameters associated with the stream of commands.

15. The method of claim 13, wherein delaying execution of the stream of commands comprises inserting a delay.

16. The method of claim 13, wherein the memory comprises a plurality of memory dies, and wherein delaying execution of the stream of commands comprises reducing die parallelism.

17. The method of claim 13, wherein the memory comprises a three-dimensional memory.

18. The method of claim 13:
wherein the analyzing the stream of commands to determine whether or not the stream of commands is from the user who is expecting the response to the stream of commands comprises analyzing the stream of commands from a host; and
wherein the memory system is embedded in the host.

19. The method of claim 13:
wherein the analyzing the stream of commands to determine whether or not the stream of commands is from the user who is expecting the response to the stream of commands comprises analyzing the stream of commands from a host; and
wherein the memory system is removably connected to the host.

* * * * *